| (12) United States Patent
Liu et al. | (10) Patent No.: US 10,133,480 B2
(45) Date of Patent: Nov. 20, 2018 |

(54) METHOD FOR ADJUSTING INPUT-METHOD KEYBOARD AND MOBILE TERMINAL THEREOF

(71) Applicant: SHENZHEN SHI JI GUANG SU INFORMATION TECHNOLOGY CO., LTD., Shenzhen (CN)

(72) Inventors: Dingxi Liu, Shenzhen (CN); Hao Wu, Shenzhen (CN); Ruicong Wang, Shenzhen (CN)

(73) Assignee: SHENZHEN SHI JI GUANG SU INFORMATION TECHNOLOGY CO., LTD., Shenzhen (CN)

( * ) Notice: Subject to any disclaimer, the term of this patent is extended or adjusted under 35 U.S.C. 154(b) by 450 days.

(21) Appl. No.: 14/385,383

(22) PCT Filed: Mar. 12, 2013

(86) PCT No.: PCT/CN2013/072487
§ 371 (c)(1),
(2) Date: Dec. 15, 2014

(87) PCT Pub. No.: WO2013/135169
PCT Pub. Date: Sep. 19, 2013

(65) Prior Publication Data
US 2015/0143269 A1    May 21, 2015

(30) Foreign Application Priority Data
Mar. 13, 2012 (CN) .......................... 2012 1 0064731

(51) Int. Cl.
*G06F 3/0488* (2013.01)
*G06F 3/0484* (2013.01)

(52) U.S. Cl.
CPC ........ *G06F 3/04886* (2013.01); *G06F 3/0488* (2013.01); *G06F 3/04845* (2013.01);
(Continued)

(58) Field of Classification Search
None
See application file for complete search history.

(56) References Cited

U.S. PATENT DOCUMENTS 9,086,769 B2 * 7/2015 Paulsen ................... G06F 3/044
2006/0132460 A1 * 6/2006 Kolmykov-Zotov .......................
G06F 3/04812
345/173

(Continued)

*Primary Examiner* — Taghi T Arani
*Assistant Examiner* — F J Farhadian
(74) *Attorney, Agent, or Firm* — Anova Law Group, PLLC

(57) ABSTRACT

A method for adjusting an input-method keyboard includes: recording the sliding trajectories of a user's two fingers, and the trajectories include two starting contact points and two ending contact points of the two-finger sliding gesture; calculating an adjustment ratio according to the sliding trajectories; obtaining the current state of the input-method keyboard, and the state can be one of a maximum state, an intermediate state and a minimum state; and adjusting the size and/or layout of the current input-method keyboard according to the adjustment ratio and the current state of the input-method keyboard. The mobile terminal for adjusting an input-method keyboard includes a recording module, a calculation module, an acquisition module and an adjustment module. This method allows users to intuitively modify the size and layout of the input-method keyboard comprehensively, thus avoids accidental operation, enhances the user experience and strengthens the reputation and competence of the product.

5 Claims, 9 Drawing Sheets

(52) U.S. Cl.
CPC .............. *G06F 2203/04803* (2013.01); *G06F 2203/04808* (2013.01)

(56) References Cited

U.S. PATENT DOCUMENTS

| | | | |
|---|---|---|---|
| 2011/0078614 A1* | 3/2011 | Lee ..................... | G06F 3/04886 715/773 |
| 2011/0102464 A1* | 5/2011 | Godavari .............. | G06F 3/0416 345/650 |
| 2012/0131514 A1* | 5/2012 | Ansell ................. | G06F 3/03543 715/863 |
| 2012/0200503 A1* | 8/2012 | Berenger ............ | G06F 3/04886 345/168 |
| 2013/0002562 A1* | 1/2013 | Leskela ................. | G06F 3/0237 345/169 |

* cited by examiner

METHOD FOR ADJUSTING INPUT-METHOD KEYBOARD AND MOBILE TERMINAL THEREOF

CROSS-REFERENCES TO RELATED APPLICATIONS

This application claims the priority of Chinese Patent Application No. 2012100647313, entitled "Method for adjusting input-method keyboard and mobile terminal thereof," filed on Mar. 13, 2012, the entire contents of which is incorporated herein by reference.

FIELD OF THE DISCLOSURE

The present disclosure relates to the field of mobile terminal technologies and, more particularly, relates to a method for adjusting an input-method keyboard and a mobile terminal thereof.

BACKGROUND

Along with the development of full touch screen in the field of electronics, there are more and more mobile terminals equipped with a full touch screen. A user can enter characters and perform other operations with his/her fingers touching and sliding on the full touch screen of a mobile terminal.

In general, a user enters characters through an input-method which is compatible with a full touch screen mobile terminal. Among input-methods designed for full touch screen mobile terminals, most of them copy the user interfaces and display modes from traditional cell phones, including virtualized keyboards and input windows on the touch screen. To accommodate the practical needs of users, various kinds of the input-method keyboards are provided and can be adjusted according to users' preferences. Different input-method keyboards have different sizes and layouts.

The current approach to adjust input-method keyboard is mainly modifying the layouts. Specifically, one approach is to place an adjustment button on the input-method keyboard interface. When a user taps the button on the touch screen with a finger, the layout of the current input-method keyboard is modified. Another approach is to set a gesture recognition feature of linear sliding on the interface of the input-method keyboard. When a user linearly slides a finger on the touch screen, the current layout of the input-method keyboard is modified.

However, current technologies have at least the following disadvantages:

For the current two approaches for adjusting input-method keyboards, in the first approach, the adjustment button takes up certain space on the interface which affects the appearance and lowers the processing ability of the interface. In the second approach, linearly sliding gesture may be triggered by accidental operation of a user which affects the user experience. Further, both approaches only convert the layouts of the input-method and, thus, are not comprehensive enough to accommodate users' practical requirements.

BRIEF SUMMARY OF THE DISCLOSURE

For users to comprehensively adjust an input-method keyboard according to the users' own practical needs and to avoid accidental operation, various embodiments of the present invention provide a method for adjusting an input-method keyboard and a mobile terminal thereof. The technical solutions are as follows:

A method for adjusting an input-method keyboard, comprising:
recording sliding trajectories of a user's two fingers, the sliding trajectories including two starting contact points and two ending contact points produced by the sliding of the user's two fingers;
calculating an adjustment ratio according to the recorded sliding trajectories;
obtaining a current state of the input-method keyboard, the state of the input-method keyboard being one of a maximum state, an intermediate state and a minimum state; and
adjusting at least one of a size and a layout of the current input-method keyboard according to the adjustment ratio and the current state of the input-method keyboard.

Specifically, calculating an adjustment ratio according to the recorded sliding trajectories include:
calculating a distance between the two starting contact points and a distance between the two ending contact points; and
dividing the distance between the two ending contact points by the distance between the two starting contact points to obtain the adjustment ratio.

Before obtaining the current state of the input-method keyboard, the method further includes:
determining whether to obtain the current state of the input-method keyboard according to the adjustment ratio; and
when the adjustment ratio is not equal to 1, obtaining the current state of the input-method keyboard.

Specifically, adjusting the size of the current input-method keyboard according to the adjustment ratio and the current state of the input-method keyboard includes:
determining whether to enlarge or shrink the current input-method keyboard according to the adjustment ratio and the current state of the input-method keyboard;
when the adjustment ratio is larger than 1 and the current input-method keyboard is in the minimum or intermediate state, enlarging the current input-method keyboard from the minimum state to the intermediate state, or from the intermediate state to the maximum state; and
when the adjustment ratio is less than 1 and the current input-method keyboard is in the intermediate or maximum state, shrinking the current input-method keyboard from the intermediate state to the minimum state, or from the maximum state to the intermediate state.

Specifically, adjusting the layout of the current input-method keyboard according to the adjustment ratio and the current state of the input-method keyboard further includes:
determining whether to convert the layout of the current input-method keyboard to a full keyboard or a nine-grid keyboard according to the adjustment ratio and the current state of the input-method keyboard;
when the adjustment ratio is larger than 1 and the current input-method keyboard is in the minimum state, converting the layout of the current input-method keyboard to a full keyboard; and
when the adjustment ratio is smaller than 1 and the current input-method keyboard is in the intermediate state, converting the layout of the current input-method keyboard to a nine-grid keyboard.

A mobile terminal, comprising:
a recording module configured to record sliding trajectories of a user's two fingers, the sliding trajectories including two starting contact points and two ending contact points produced by the sliding of the user's two fingers;

a calculation module configured to calculate an adjustment ratio according to the recorded sliding trajectories;

an acquisition module configured to obtain a current state of the input-method keyboard, the state of the input-method keyboard being one of a maximum state, an intermediate state and a minimum state; and an adjustment module configured to adjust at least one of a size and a layout of the current input-method keyboard according to the adjustment ratio and the current state of the input-method keyboard.

Specifically, the calculation module includes:

a first calculation unit configured to calculate a distance between the two starting contact points and a distance between the two ending contact points; and a second calculation unit configured to divide the distance between the two ending contact points by the distance between the two starting contact points to obtain the adjustment ratio.

Specifically, the acquisition module is further configured to:

determine whether to obtain the current state of the input-method keyboard according to the adjustment ratio; and when the adjustment ratio is not equal to 1, obtain the current state of the input-method keyboard.

Specifically, the adjustment module includes:

a first decision unit configured to determine whether to enlarge or shrink the current input-method keyboard according to the adjustment ratio and the current state of the input-method keyboard;

an enlarging unit configured to enlarge the current input-method keyboard from the minimum state to the intermediate state, or from the intermediate state to the maximum state, when the adjustment ratio is larger than 1 and the current input-method keyboard is in the minimum or intermediate state; and a shrinking unit configured to shrink the current input-method keyboard from the intermediate state to the minimum state, or from the maximum state to the intermediate state, when the adjustment ratio is less than 1 and the current input-method keyboard is in the intermediate or maximum state.

Specifically, the adjustment module includes:

a second decision unit configured to determine whether to convert the layout of the current input-method keyboard to a full keyboard or a nine-grid keyboard, according to the adjustment ratio and the current state of the input-method keyboard;

a full keyboard unit configured to convert the layout of the current input-method keyboard to a full keyboard, when the adjustment ratio is larger than 1 and the current input-method keyboard is in the minimum state; and a nine-grid keyboard unit configured to convert the layout of the current input-method keyboard to a nine-grid keyboard, when the adjustment ratio is smaller than 1 and the current input-method keyboard is in the intermediate state.

The beneficial effects brought by the technical solutions provided in the embodiment are: by recording the sliding trajectories of a user's two fingers and obtaining the two starting contact points and two ending contact points, the method incorporates the characteristics of touch screen and adjusts the input-method keyboard by gesture recognition. In addition, since it is a two-finger sliding gesture, the method may avoid accidental operation by the user and enhance user experience. The method further includes calculating the adjustment ratio according to the recorded sliding trajectories; obtaining the current state of the input-method keyboard, and the state of the input-method keyboard can be one of a maximum state, an intermediate state, and a minimum state; adjusting the size and/or layout of the current input-method keyboard according to the adjustment ratio and the current state of the input-method keyboard. As the size status of the current input-method keyboard is taken into consideration while adjusting, users may intuitively modify the size and/or layout of the input-method keyboard comprehensively according to their practical needs. This further enhances user experience and strengthens the reputation and competence of the product.

BRIEF DESCRIPTION OF THE DRAWINGS

In order to clearly illustrate the technical solutions in the embodiments of the present invention, the drawings for describing the embodiments are briefly introduced in the following part. Apparently, persons of ordinary skill in the art, under the premise of without doing any creative work, may derive other drawings consistent with the present disclosure drawings.

DETAILED DESCRIPTION

To make the objectives, technical solutions and advantages of the present invention become clearer, hereinafter, embodiments of the present invention will be further described specifically with reference to drawings.

Embodiment 1

Figure 1:
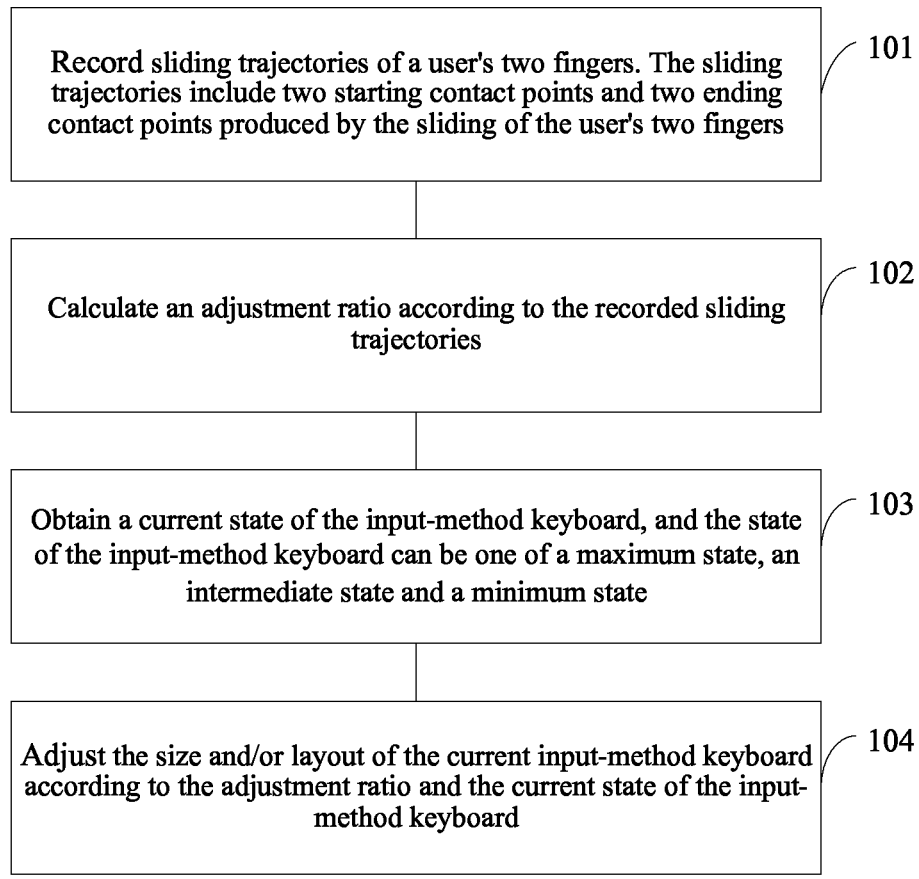
FIG. 1 is a flow chart of an exemplary method for adjusting an input-method keyboard according to embodiment 1.

As shown in FIG. 1, Embodiment 1 provides a method for adjusting an input-method key board, and the method may include the following steps:

101: recording the sliding trajectories of a user's two fingers, and the sliding trajectories include two starting contact points and two ending contact points produced in the two-finger sliding gesture.

102: Calculating an adjustment ratio according to the recorded sliding trajectories.

103: Obtaining the current state of the input-method keyboard, and the state of the input-method keyboard can be one of a maximum state, an intermediate state, and a minimum state.

104: Adjusting the size and/or layout of the current input-method keyboard according to the adjustment ratio and the current state of the input-method keyboard.

The beneficial effects brought by the technical solutions provided in the embodiment includes: by recording the sliding trajectories of a user's two fingers and obtaining the two starting contact points and two ending contact points, the method incorporates the characteristics of touch screen and adjusts the input-method keyboard by gesture recognition. In addition, since it is a two-finger sliding gesture, the method may avoid accidental operation by the user and enhance user experience. The method further calculates the adjustment ratio according to the recorded sliding trajectories; obtains the current state of the input-method keyboard, and adjusts the size and/or layout of the current input-method keyboard according to the adjustment ratio and the current state of the input-method keyboard. The state of the input-method keyboard can be one of a maximum state, an intermediate state, and a minimum state. As the size status of the current input-method keyboard is taken into consideration while adjusting, users may intuitively modify the size and/or layout of the input-method keyboard comprehensively according to their practical needs. This further enhances user experience and strengthens the reputation and competence of the product.

Embodiment 2

Figure 2:
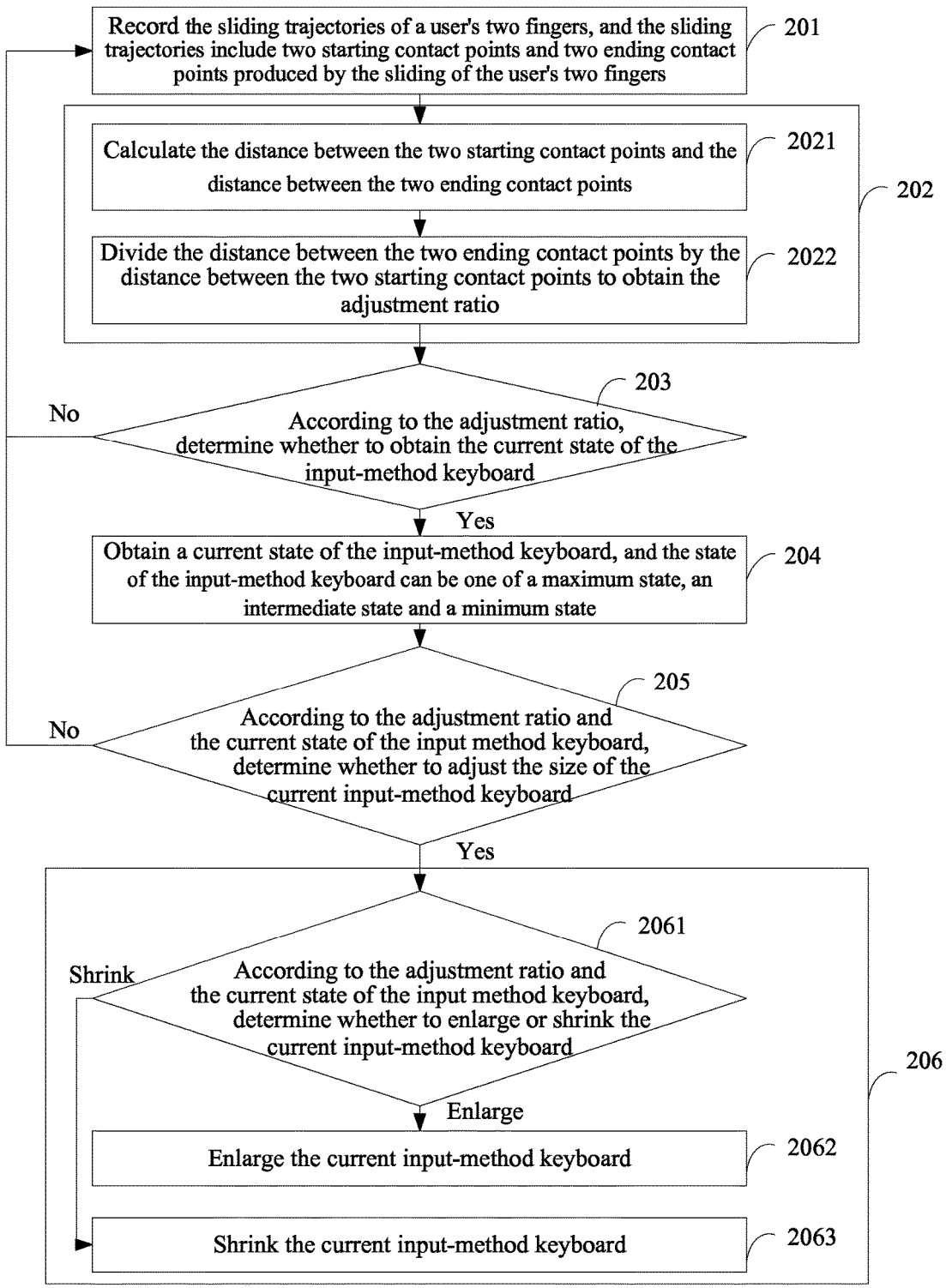
FIG. 2 is a flow chart of an exemplary method for adjusting an input-method keyboard according to embodiment 2.

As shown in FIG. 2, Embodiment 2 provides a method for adjusting an input-method keyboard. Using a tablet computer as an exemplary mobile terminal, this method includes:

201: recording the sliding trajectories of a user's two fingers, and the sliding trajectories include two starting contact points and two ending contact points produced in the two-finger sliding gesture.

When a user of a tablet computer is using an input-method keyboard displayed on the touch screen to perform input operation, such as entering a uniform resource locator (URL) in the address bar of a browser, writing texts in a document, or entering account number and password in a log-in screen, etc., the user may intend to adjust the current input-method keyboard. For example, a horizontal full keyboard that extends the full screen is adjusted to an input-method keyboard that occupies less screen space. Thus, the user may place two fingers at an arbitrary location on the touch screen, and slide the two fingers toward each other on the screen surface for a certain distance.

In addition, if the user would like to adjust the current input-method keyboard to an input-method keyboard that occupies a relatively larger screen space, the user may place two fingers at an arbitrary location on the touch screen, and slide the two fingers away from each other on the screen surface for a certain distance.

Further, the touch contact positions are detected in real time, the sliding trajectories of the user's two fingers are recorded, and the sliding trajectories may include two starting contact points and two ending contact points produced by the sliding two fingers. Specifically, when detecting the occurrence of user finger sliding, the two starting contact points of the user's two fingers are recorded respectively. During the sliding process, the continuous contact points of the two fingers are recorded respectively to determine if the user ends the sliding motion. When the ending of the sliding motion is detected, the two ending contact points of the user's two fingers are recorded respectively. Further, the recorded starting points and ending points are represented in coordinates, and certain existing technologies may be used to implement such.

202: calculating an adjustment ratio according to the recorded sliding trajectories. This step further includes:

2021: calculating the distance between the two starting contact points and the distance between the two ending contact points.

Specifically, according to the coordinates of the two recorded starting contact points and the two ending contact points, use existing mathematical equations to calculate the distance between the two starting contact points and the distance between the two ending contact points respectively.

2022: dividing the distance between the two ending contact points by the distance between the two starting contact points to obtain the adjustment ratio.

Specifically, after calculating the distance between the two starting contact points and the distance between the two ending contact points respectively, the distance between the two ending contact points is divided by the distance between the two starting contact points to obtain the adjustment ratio. Further, the adjustment ratio may be an approximate value, which may keep one digit after the decimal point, for example, 0.8 or 1.2.

203: according to the adjustment ratio, determining whether to obtain the current state of the input-method keyboard.

If yes, the process goes to 204; if no, the process exits the present adjusting process and returns to 201.

Specifically, if the adjustment ratio is not 1, it is determined to obtain the current state of the input-method keyboard, and the process goes to 204. If the adjustment ratio is 1, it is determined not to obtain the current state of the input-method keyboard, the adjusting process completes and returns to 201.

204: obtaining the current state of the input-method keyboard. The current state of the input-method keyboard may be in one of the maximum state, the intermediate state, and the minimum state.

To facilitate the size adjustment of the input-method keyboard according to users' practical requirements, according to the present embodiments, three input-method keyboard states are provided, including a maximum state, an intermediate state, and a minimum state. Specifically, the input-method keyboard in the maximum state occupies most screen space, contains the most numbers of keys, and the size of each key is the biggest. For example, an input-method keyboard in the maximum state may horizontally occupy the entire lower part of the display screen. The input-method keyboard in the intermediate state takes up less screen space, includes relatively more keys, and the size of each key is relatively big. For example, an input-method keyboard in the intermediate state may cover two thirds of the lower part of the display screen. Further, the input-method keyboard in the minimum state occupies the least screen space, includes the least number of keys, and the size of each key is the smallest. For example, the input-method keyboard in the minimum state may cover one third of the lower part of the display screen.

205: determining whether to adjust the size of the current input-method keyboard according to the adjustment ratio and the current state of the input-method keyboard;

If yes, the process goes to 206; if no, the process exits the present adjusting process, and returns to 201.

Specifically, together with the adjustment ratio and the current state of the input-method keyboard, there are three possible decision conditions:

A, if the current input-method keyboard is in the maximum state and the adjustment ratio is less than 1, it is determined to adjust the size of the current input-method keyboard, and the process goes to 206; if the current input-method keyboard is in the maximum state and the adjustment ratio is larger than 1, it is determined not to adjust the size of the current input-method keyboard, and the process exits the present adjusting process and returns to 201.

B, if the current input-method keyboard is in the intermediate state, it is determined to adjust the size of the current input-method keyboard, and the process goes to 206.

C, if the current input-method keyboard is in the minimum state and the adjustment ratio is larger than 1, it is determined to adjust the size of the current input-method keyboard, and the process goes to 206; if the current input-method keyboard is in the minimum state and the adjustment ratio is less than 1, it is determined not to adjust the size of the current input-method keyboard, and the process exits the present adjusting process and returns to 201.

206: according to the adjustment ratio and the current state of the input-method keyboard, adjusting the size of the current input-method keyboard correspondingly. This step further includes:

2061: according to the adjustment ratio and the current state of the input-method keyboard, determining to either enlarge or shrink the current input-method keyboard.

Specifically, if the adjustment ratio is larger than 1 and the current input-method keyboard is in the minimum or intermediate state, it is determined to enlarge the current input-method keyboard, and the process goes to 2062; if the adjustment ratio is less than 1, and the current input-method keyboard is in the intermediate or maximum state, it is determined to shrink current input-method keyboard, and the process goes to 2063.

2062: Enlarging the current input-method keyboard. That is, enlarging the current input-method keyboard from the minimum state to the intermediate state, or from the intermediate state to the maximum state.

2063: Shrinking the current input-method keyboard. That is, shrinking the current input-method keyboard from the intermediate state to the minimum state, or from the maximum state to the intermediate state.

The beneficial effects brought by the technical solutions provided in the embodiment are: by recording the sliding trajectories of a user's two fingers and obtaining the two starting contact points and two ending contact points, the method incorporates the characteristics of touch screen and adjusts the input-method keyboard by gesture recognition. In addition, since it is a two-finger sliding gesture, the method may avoid accidental operation by the user and enhance user experience. The method further calculates the adjustment ratio according to the recorded sliding trajectories; obtains the current state of the input-method keyboard, and adjusts the size and/or layout of the current input-method keyboard according to the adjustment ratio and the current state of the input-method keyboard. The state of the input-method keyboard can be one of a maximum state, an intermediate state, and a minimum state. As the size status of the current input-method keyboard is taken into consideration while adjusting, users may intuitively modify the size and/or layout of the input-method keyboard comprehensively according to their practical needs. This further enhances user experience and strengthens the reputation and competence of the product.

Embodiment 3

Figure 3:
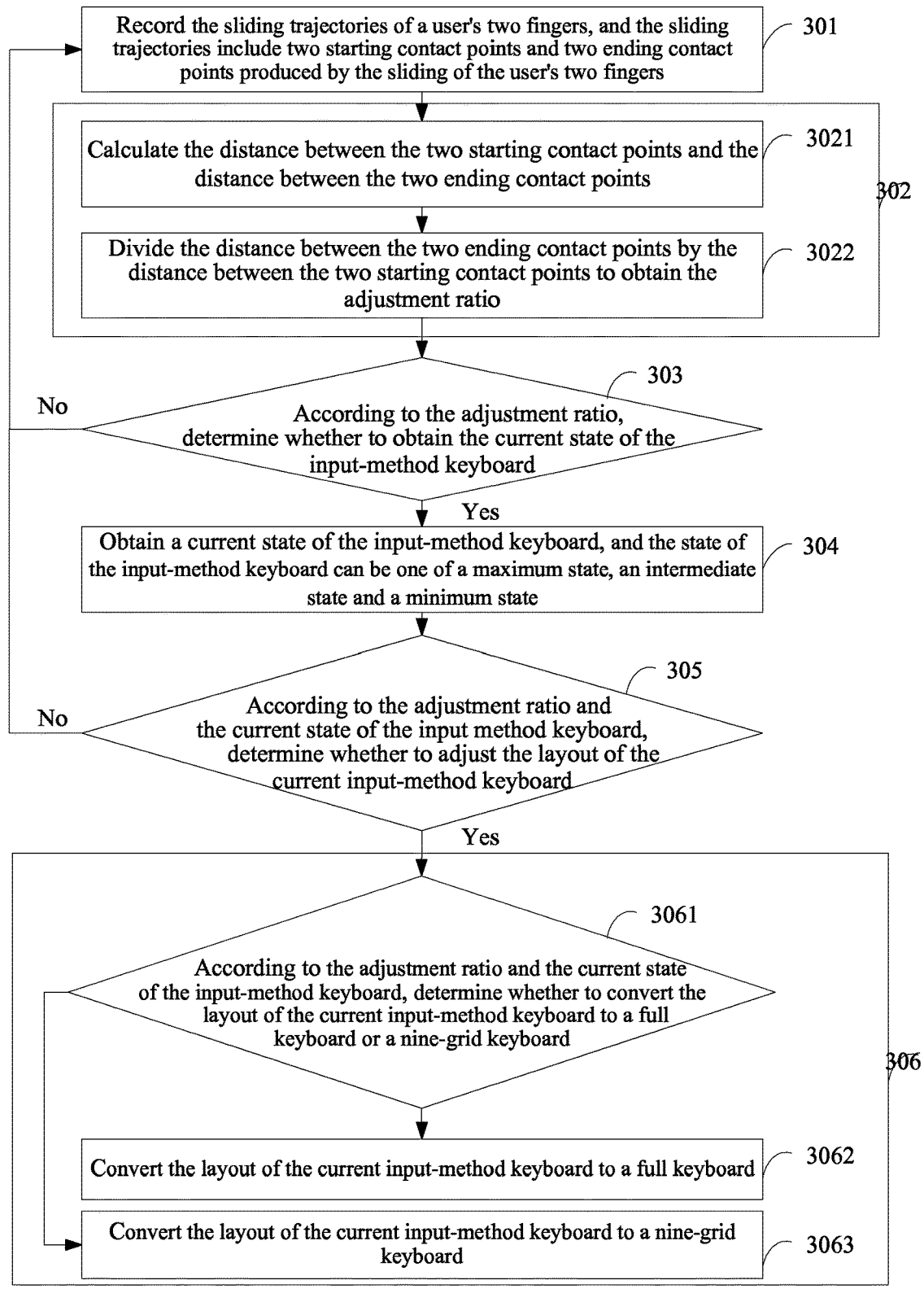
FIG. 3 is a flow chart of an exemplary method for adjusting an input-method keyboard according to embodiment 3.
Figure 4:
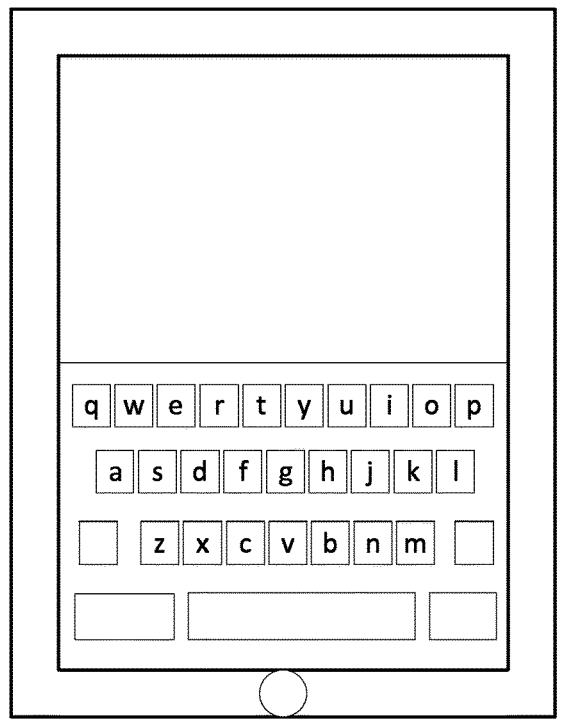
FIG. 4 shows an illustrative full keyboard layout according to embodiment 3 or a maximum full keyboard according to embodiment 4.
Figure 5:
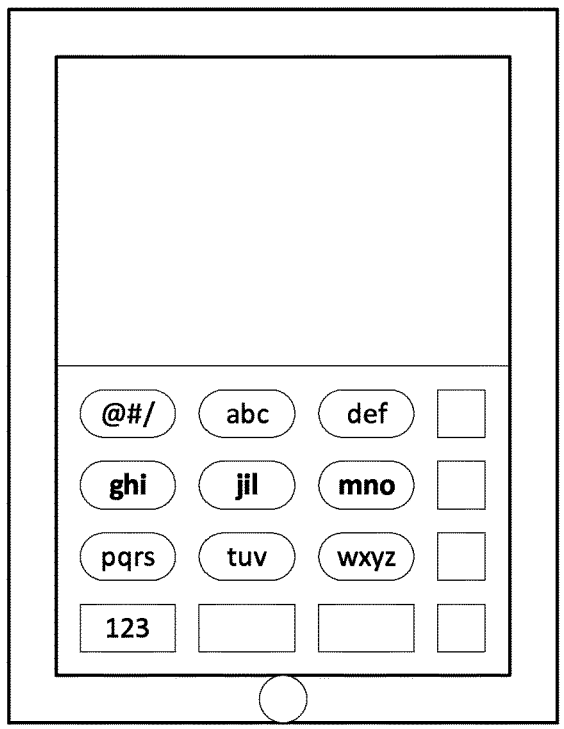
FIG. 5 shows an illustrative nine-grid keyboard layout according to embodiment 3.
Figure 6:
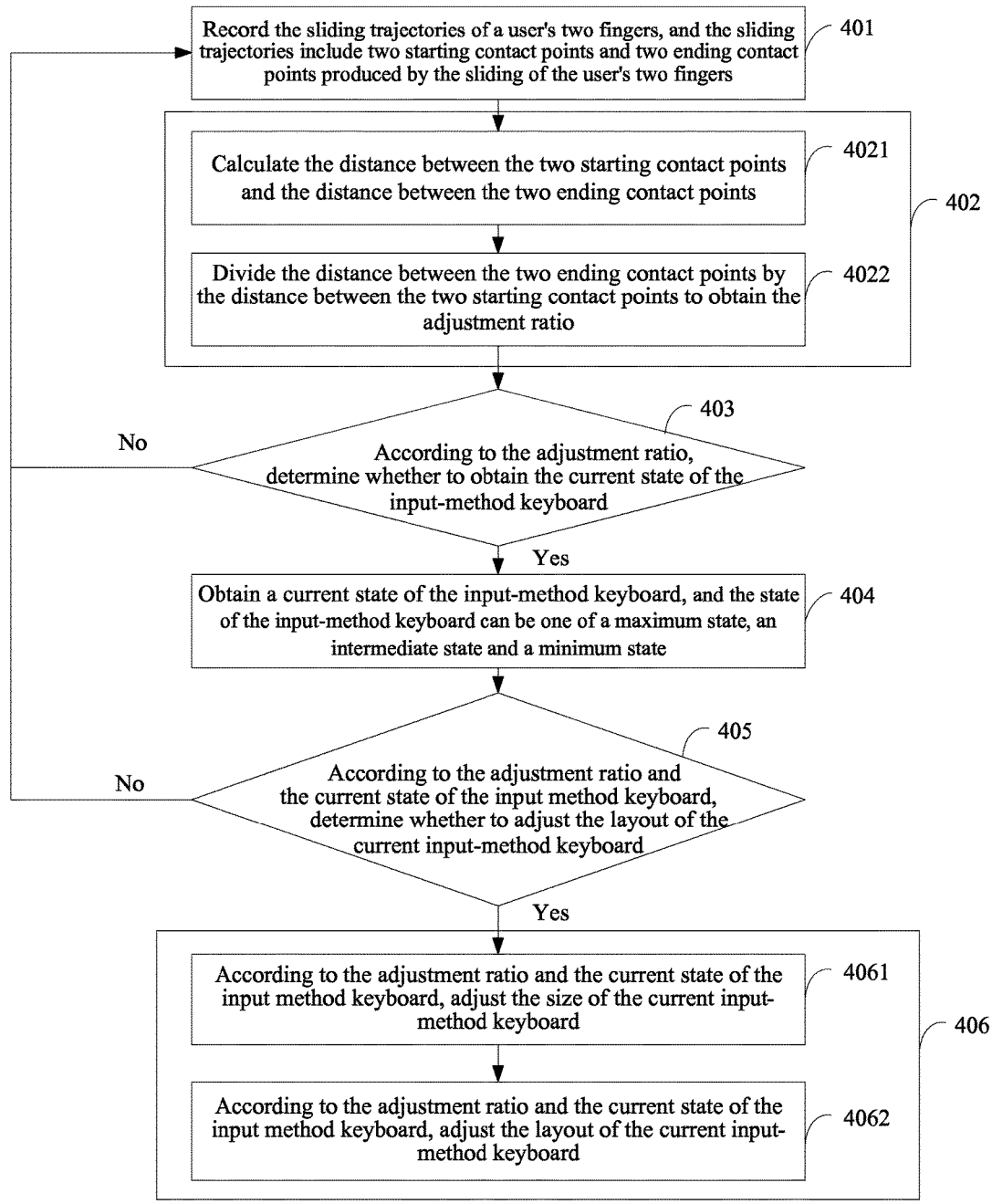
FIG. 6 is a flow chart of an exemplary method for adjusting an input-method keyboard according to embodiment 4.

As shown in FIG. 3-FIG. 5, Embodiment 3 provides a method for adjusting an input-method keyboard. Using a tablet computer as an exemplary mobile terminal, this method includes:

301-304 are the same as 201-204 in Embodiment 2 and are not repeated here.

305: According to the adjustment ratio and the current state of the input-method keyboard, determining whether to convert the layout of the current input-method keyboard.

If yes, the process goes to 306; if no, the process exits the present adjusting process and returns to 301.

Specifically, together with the adjustment ratio and the current state of the input-method keyboard, there are two possible decision conditions:

A, when the adjustment ratio is less than 1, if the current input-method keyboard is in the intermediate state, it is determined to convert the layout of the current input-method keyboard and the process goes to 306; else, it is determined not to convert the layout of the current input-method keyboard, and the process exists the present adjusting process and returns to 301.

B, when the adjustment ratio is larger than 1, if the current input-method keyboard is in the minimum state, it is determined to convert the layout of the current input-method keyboard, and the process goes to 306; else, it is determined not to convert the layout of the current input-method keyboard, and the process exits the present adjusting process and returns to 301.

306: According to the adjustment ratio and the current state of the input-method keyboard, converting the layout of the current input-method keyboard correspondingly.

Common layouts of the input-method include full keyboard (QWERTY keyboard) and nine-grid keyboard (numeric keypad). A full keyboard has a large number of keys and is very comprehensive, while a nine-grid keyboard has less keys. Both layouts have extensive user groups and most input-methods provide support for both layouts. This step further includes:

3061: according to the adjustment ratio and the current state of the input-method keyboard, determining whether to convert the layout of the current input-method keyboard to a full keyboard or a nine-grid keyboard.

Specifically, if the adjustment ratio is larger than 1 and the current input-method keyboard is in the minimum state, the process goes to 3062; if the adjustment ratio is less than 1 and the current input-method keyboard is in the intermediate or maximum state, the process goes to 3063.

3062: Converting the layout of the current input-method keyboard to a full keyboard.

Specifically, as shown in FIG. 4, converting the layout of the current input-method keyboard to a full keyboard layout.

3063: Converting the layout of the current input-method keyboard to a nine-grid keyboard.

Specifically, as shown in FIG. 5, converting the layout of the current input-method keyboard to a nine-grid layout.

The beneficial effects brought by the technical solutions provided in the embodiment are: by recording the sliding trajectories of a user's two fingers and obtaining the two starting contact points and two ending contact points, the method incorporates the characteristics of touch screen and adjusts the input-method keyboard by gesture recognition. In addition, since it is a two-finger sliding gesture, the method may avoid accidental operation by the user and enhance user experience. The method calculates the adjustment ratio according to the recorded sliding trajectories; obtains the current state of the input-method keyboard, and adjusts the size and/or layout of the current input-method keyboard according to the adjustment ratio and the current state of the input-method keyboard. The state of the input-method keyboard can be one of a maximum state, an intermediate state, and a minimum state; As the size status of the current input-method keyboard is taken into consideration while adjusting, users may intuitively modify the size and/or layout of the input-method keyboard comprehensively according to their practical needs. This further enhances user experience and strengthens the reputation and competence of the product.

Embodiment 4

As shown in FIG. 4 and FIG. 6-FIG. 9, Embodiment 4 provides a method for adjusting an input-method keyboard. Using a tablet computer as an exemplary mobile terminal, this method includes:

401-404 are the same as 301-304 in Embodiment 3.

405: According to the adjustment ratio and the current state of the input-method keyboard, determining whether to adjust the size and layout of the current input-method keyboard;

If yes, the process goes to 406; if no, the process exits the present adjusting process and returns to 401.

Specifically, together with the adjustment ratio and the current state of the input-method keyboard, there are three possible decision conditions:

A, if the current input-method keyboard is in the maximum state and the adjustment ratio is less than 1, it is determined to adjust the size and layout of the current input-method keyboard, and the process goes to 406; if the current input-method keyboard is in the maximum state and the adjustment ratio is larger than 1, it is determined not to adjust the size and layout of the current input-method keyboard, and the process exits present adjusting process and returns to 401.

B, if the current input-method keyboard is in the intermediate state, it is determined to adjust the size and layout of the current input-method keyboard, and the process goes to 406.

C, if the current input-method keyboard is in the minimum state and the adjustment ratio is larger than 1, it is determined to adjust the size and layout of the current input-method keyboard, and the process goes to 406; if the current input-method keyboard is in the minimum state and the adjustment ratio is less than 1, it is determined not to adjust the size and layout of the current input-method keyboard, and the process exits present adjusting process and returns to 401.

405: According to the adjustment ratio and the current state of the input-method keyboard, adjusting the size and layout of the current input-method keyboard correspondingly. This step further includes:

4061: according to the adjustment ratio and the current state of the input-method keyboard, adjusting the size of the current input-method keyboard correspondingly.

4061a: According to the adjustment ratio and the current state of the input-method keyboard, determining to either enlarge or shrink current input-method keyboard.

Specifically, if the adjustment ratio is larger than 1 and the current input-method keyboard is in the minimum or intermediate state, it is determined to enlarge current input-method keyboard, and the process goes to 4061b; if the adjustment ratio is less than 1, and the current input-method keyboard is in the intermediate or maximum state, it is determined to shrink current input-method keyboard, and the process goes to 4061c.

4061b: Enlarging the current input-method keyboard.

That is, enlarging the current input-method keyboard from the minimum state to the intermediate state, or from the intermediate state to the maximum state.

4061c: Shrinking the current input-method keyboard.

That is, reducing the current input-method keyboard from the intermediate state to the minimum state, or from the maximum state to the intermediate state.

4062: According to the adjustment ratio and the current state of the input-method keyboard, converting the layout of the current input-method keyboard correspondingly.

4062a: According to the adjustment ratio and the current state of the input-method keyboard, determining whether to convert the layout of the current input-method keyboard to a full keyboard or a nine-grid keyboard.

Specifically, if the adjustment ratio is larger than 1 and the current input-method keyboard is in the minimum state, the process goes to 4062b; if the adjustment ratio is less than 1 and the current input-method keyboard is in the intermediate or maximum state, the process goes to 4062c.

Figure 7:
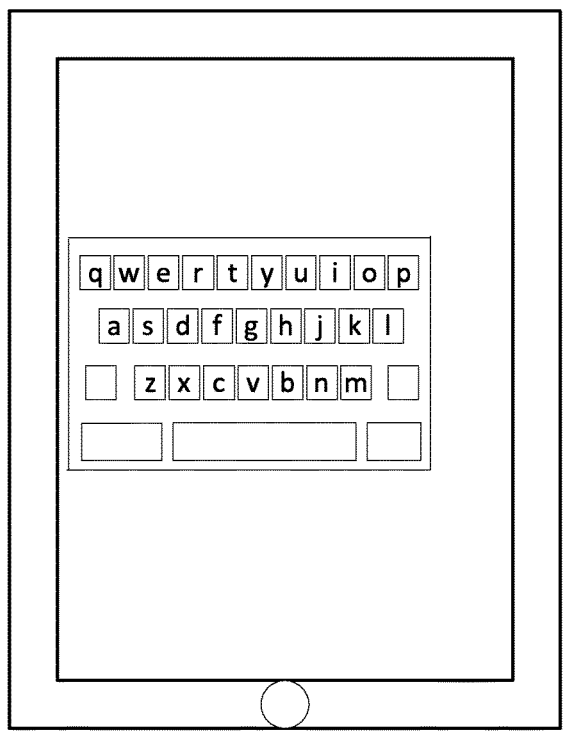
FIG. 7 shows an illustrative full keyboard layout in the intermediate state according to embodiment 4.
Figure 8:
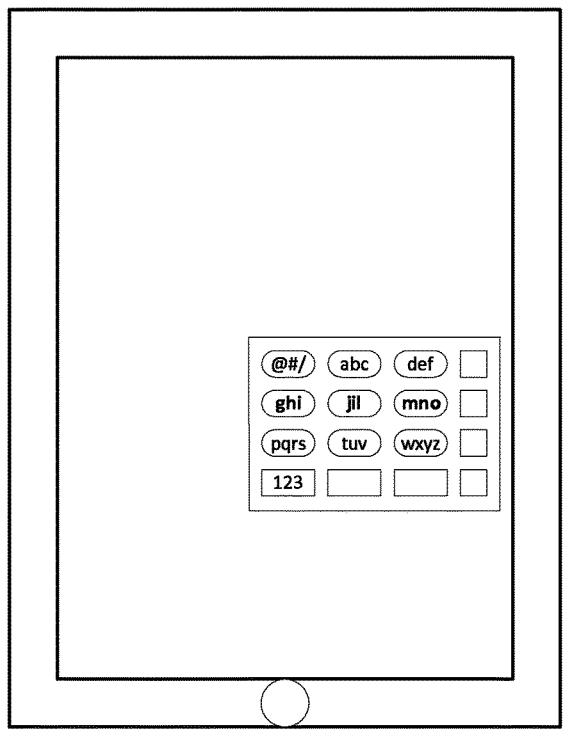
FIG. 8 shows an illustrative nine-grid keyboard layout in the minimum state according to embodiment 4.

Thus, according to current embodiments, three layouts are provided for input-method keyboard, including a full keyboard in the maximum state (as shown in FIG. 4), a full keyboard in the intermediate state (as shown in FIG. 7) and a nine-grid keyboard in the minimum state (as shown in FIG. 8). Specifically, the full keyboard in the maximum state contains the whole set of keys and horizontally covers the screen fully. The full keyboard in the intermediate state contains a portion of the whole key set (for example, all the keys except the small keypad). Also, the size of the keys is smaller than that of the keyboard in the maximum state, and the full keyboard in the intermediate state covers relatively smaller screen space. The nine-grid keyboard (numeric keypad) in the minimum state contains 9 keys and/or other auxiliary keys, and covers the least screen space. In addition, the types of the input-method keyboards are not limited to the above mentioned three. For example, another type of an input-method keyboard may include two nine-grid keyboards (separating the letters from numbers in nine-grid keyboard such that there are a total of 18 keys). In addition, to accommodate users' requirements, the input-method keyboard in the minimum and intermediate state may be configured to have the capability of moving to an arbitrary location on the screen.

4062b: Converting the layout of the current input-method keyboard to a full keyboard.

Specifically, converting the layout of the current input-method keyboard to a full keyboard may adjust the current input-method keyboard to a full keyboard in the intermediate state as shown in FIG. 7. On one hand, the input-method keyboard in the intermediate state occupies relatively less screen space which saves the space to some extent; on the other hand, a full keyboard layout which contains a large number of keys may facilitate users' keyboard operations.

4062c: Converting the layout of the current input-method keyboard to a nine-grid keyboard.

Specifically, converting the layout of the current input-method keyboard to a nine-grid layout may adjust the current input-method keyboard to a nine-grid keyboard in the minimum state as shown in FIG. 8. On one hand, the input-method keyboard in the minimum state requires the least screen space which saves the space; on the other hand, a nine-grid keyboard layout which contains a small number of keys may facilitate users' keyboard operations.

The beneficial effects brought by the technical solutions provided in the embodiment are: by recording the sliding trajectories of a user's two fingers and obtaining the two starting contact points and two ending contact points, the method incorporates the characteristics of touch screen and adjusts the input-method keyboard by gesture recognition. In addition, since it is a two-finger sliding gesture, the method may avoid accidental operation by the user and enhance user experience. The method further calculates the adjustment ratio according to the recorded sliding trajectories; obtains the current state of the input-method keyboard, and adjusts the size and/or layout of the current input-method keyboard according to the adjustment ratio and the current state of the input-method keyboard. The state of the input-method keyboard can in one of a maximum state, an intermediate state, and a minimum state; As the size status of the current input-method keyboard is taken into consideration while adjusting, users may intuitively modify the size and/or layout of the input-method keyboard comprehensively according to their practical needs. This further enhances user experience and strengthens the reputation and competence of the product.

Embodiment 5

Figure 9:
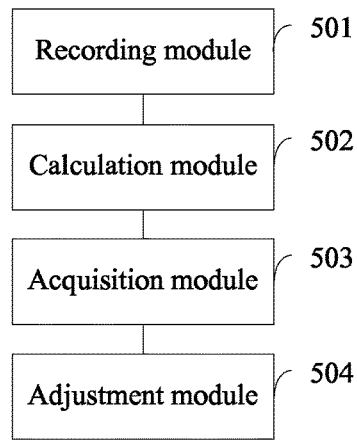
FIG. 9 is a schematic diagram of an exemplary mobile terminal according to embodiment 5.

As shown in FIG. 9, Embodiment 5 provides a mobile terminal. The mobile terminal includes:

A recording module 501 configured to record the sliding trajectories of a user's two fingers and the sliding trajectories include two starting contact points and two ending contact points produced in the two-finger sliding gesture;

A calculation module 502 configured to calculate an adjustment ratio according to the recorded sliding trajectories;

An acquisition module 503 configured to obtain the current state of the input-method keyboard, and the state of the input-method keyboard can be one of a maximum state, an intermediate state and a minimum state; and An adjustment module 504 configured to adjust the size and/or layout of the current input-method keyboard according to the adjustment ratio and the current state of the input-method keyboard.

The beneficial effects brought by the technical solutions provided in the embodiment are: by recording the sliding trajectories of a user's two fingers and obtaining the two starting contact points and two ending contact points, the characteristics of touch screen are incorporated and gesture recognition is implemented to adjust the input-method keyboard. In addition, since it is a two-finger sliding gesture, accidental operation may be avoided and user experienced may be enhanced. An adjustment ratio is calculated according to the recorded sliding trajectories. After obtaining the current state of the input-method keyboard, the size and/or layout of the current input-method keyboard can be adjusted according to the adjustment ratio and the current state of the input-method keyboard. The state of the input-method keyboard can in one of a maximum state, an intermediate state, and a minimum state. As the size status of the current input-method keyboard is taken into consideration while adjusting, users may intuitively modify the size and/or layout of the input-method keyboard comprehensively according to their practical needs. This further enhances user experience and strengthens the reputation and competence of the product.

Embodiment 6

Figure 10:
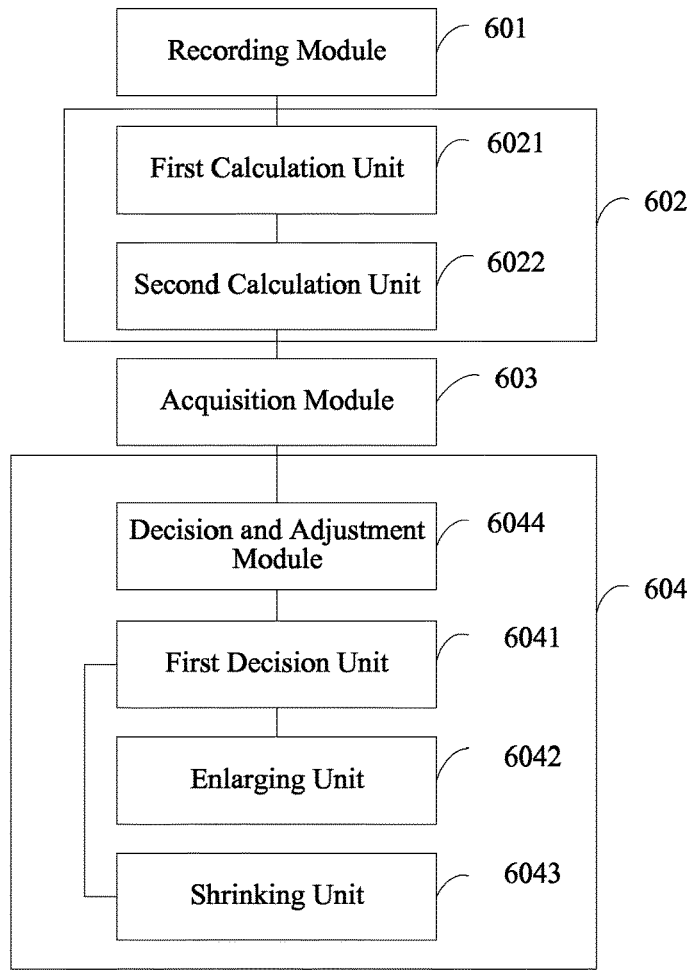
FIG. 10 is a schematic diagram of an exemplary mobile terminal according to embodiment 6.

As shown in FIG. 10, Embodiment 6 provides a mobile terminal. The mobile terminal includes:

A recording module 601 configured to record the sliding trajectories of a user's two fingers, and the sliding trajectories include two starting contact points and two ending contact points produced in the two-finger sliding gesture;

A calculation module 602 configured to calculate an adjustment ratio according to the recorded sliding trajectories;

Further, the calculation module 602 includes:

A first calculation unit 6021 configured to calculate the distance between the two starting contact points and the distance between the two ending contact points;

A second calculation unit 6022 configured to divide the distance between the two ending contact points by the distance between the two starting contact points to obtain the adjustment ratio;

An acquisition module 603 configured to obtain the current state of the input-method keyboard, and the state of the input-method keyboard can be one of a maximum state, an intermediate state and a minimum state; and An adjustment module 604, configured to adjust the size of the current input-method keyboard correspondingly according to the adjustment ratio and the current state of the input-method keyboard.

Specifically, the adjustment module 604 includes:

A first decision unit 6041 configured to determine to either enlarge or shrink the current input-method keyboard according to the adjustment ratio and the current state of the input-method keyboard;

An enlarging unit 6042 configured to enlarge the input-method keyboard from the minimum state to the intermediate state, or from the intermediate state to the maximum state, when the adjustment ratio is larger than 1 and the current input-method keyboard is in the minimum state or the intermediate state; and An shrinking unit 6043 configured to reduce the input-method keyboard from the intermediate state to the minimum state, or from the maximum state to the intermediate state, when the adjustment ratio is smaller than 1 and the current input-method keyboard is in the intermediate state or the maximum state.

The acquisition module 603 is further configured to determine whether to obtain the current state of the input-method keyboard according to the adjustment ratio. If the adjustment ratio does not equal to 1, obtain the current state of the input-method keyboard.

The adjustment module 604 further includes a decision and adjustment unit 6044 configured to determine whether to adjust the size of the current input-method keyboard according to the adjustment ratio and the current state of the input-method keyboard.

Correspondingly, the adjustment module 604 is further configured to adjust the size of the current input-method keyboard, when the current input-method keyboard is in the maximum state and the adjustment ratio is smaller than 1, or when the current input-method keyboard is in the intermediate state, or when the current input-method keyboard is in the minimum state and the adjustment ratio is larger than 1.

The beneficial effects brought by the technical solutions provided in the embodiment are: by recording the sliding trajectories of a user's two fingers and obtaining the two starting contact points and two ending contact points, the characteristics of touch screen are incorporated and gesture recognition is implemented to adjust the input-method keyboard. In addition, since it is a two-finger sliding gesture, accidental operation may be avoided and user experienced may be enhanced. An adjustment ratio is calculated according to the recorded sliding trajectories. After obtaining the current state of the input-method keyboard, the size and/or layout of the current input-method keyboard can be adjusted according to the adjustment ratio and the current state of the input-method keyboard. The state of the input-method keyboard can in one of a maximum state, an intermediate state, and a minimum state. As the size status of the current input-method keyboard is taken into consideration while adjusting, users may intuitively modify the size and/or layout of the input-method keyboard comprehensively according to their practical needs. This further enhances user experience and strengthens the reputation and competence of the product.

Embodiment 7

Embodiment 7 provides a mobile terminal. The mobile terminal includes:

A recording module, similar to the recording module 601 described in Embodiment 6, details of which are not repeated here.

A calculation module, similar to the calculation module 602 described in Embodiment 6, details of which are not repeated here.

An acquisition module, similar to the acquisition module 603 described in Embodiment 6, details of which are not repeated here.

An adjustment module configured to convert the layout of the current input-method keyboard according to the adjustment ratio and the current state of the input-method keyboard. Specifically, the adjustment module includes:

A second decision unit configured to determine whether to convert the layout of the current input-method keyboard to a full keyboard or a nine-grid keyboard, according to the adjustment ratio and the current state of the input-method keyboard.

A full keyboard unit configured to convert the layout of the current input-method keyboard to a full keyboard when the adjustment ratio is larger than 1 and the current input-method keyboard is in the minimum state.

A nine-grid keyboard unit configured to convert the layout of the current input-method keyboard to a nine-grid keyboard when the adjustment ratio is smaller than 1 and the current input-method keyboard is in the intermediate state.

Specifically, the acquisition module is further configured to determine whether to obtain the current state of the input-method keyboard according to the adjustment ratio; and, if the adjustment ratio does not equal to 1, to obtain the current state of the input-method keyboard.

Further, the adjustment module includes a decision and adjustment unit configured to determine whether to convert the layout of the current input-method keyboard according to the adjustment ratio and the current state of the input-method keyboard.

Correspondingly, the adjustment module is further configured to convert the layout of the current input-method keyboard, when the current input-method keyboard is in the intermediate state and the adjustment ratio is smaller than 1, or when the current input-method keyboard is in the minimum state and the adjustment ratio is larger than 1.

The beneficial effects brought by the technical solutions provided in the embodiment are: by recording the sliding trajectories of a user's two fingers and obtaining the two starting contact points and two ending contact points, the characteristics of touch screen are incorporated and gesture recognition is implemented to adjust the input-method keyboard. In addition, since it is a two-finger sliding gesture, accidental operation may be avoided and user experienced may be enhanced. An adjustment ratio is calculated according to the recorded sliding trajectories. After obtaining the current state of the input-method keyboard, the size and/or layout of the current input-method keyboard can be adjusted according to the adjustment ratio and the current state of the input-method keyboard. The state of the input-method keyboard can in one of a maximum state, an intermediate state, and a minimum state. As the size status of the current input-method keyboard is taken into consideration while adjusting, users may intuitively modify the size and/or layout of the input-method keyboard comprehensively according to their practical needs. This further enhances user experience and strengthens the reputation and competence of the product.

Embodiment 8

Figure 11:
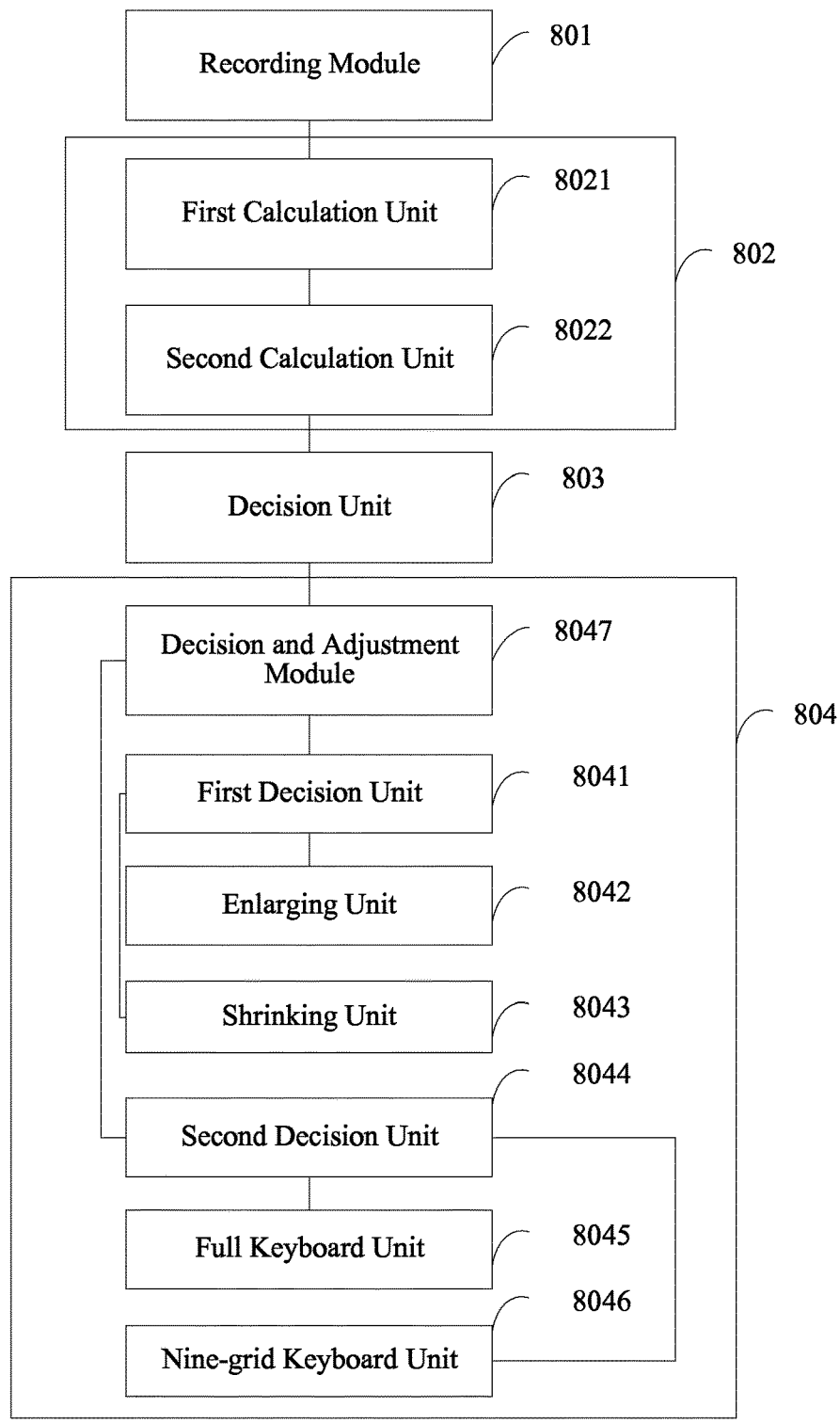
FIG. 11 is a schematic diagram of an exemplary mobile terminal according to embodiment 8.

As shown in FIG. 11, Embodiment 8 provides a mobile terminal. The mobile terminal includes:

A recording module 801, similar to the recording module described in Embodiment 7, details of which are not repeated here.

A calculation module 802, similar to the calculation module described in Embodiment 7, details of which are not repeated here.

An acquisition module 803, similar to the acquisition module described in Embodiment 7, details of which are not repeated here.

An adjustment module 804 configured to adjust the size and layout of the current input-method keyboard according to the adjustment ratio and the current state of the input-method keyboard. Specifically, the adjustment module 804 includes:

A first decision unit 8041 configured to it is determined to either enlarge or shrink current input-method keyboard according to the adjustment ratio and the current state of the input-method keyboard;

An enlarging subunit 8042 configured to enlarge the input-method keyboard from the minimum state to the intermediate state, or from the intermediate state to the maximum state, when the adjustment ratio is larger than 1 and the current input-method keyboard is in the minimum or intermediate state.

A shrinking unit 8043 configured to reduce the input-method keyboard from the intermediate state to the minimum state, or from the maximum state to the intermediate state, when the adjustment ratio is smaller than 1 and the current input-method keyboard is in the intermediate or the maximum state.

A second decision unit 8044 configured to determine whether to convert the layout of the current input-method keyboard to a full keyboard or a nine-grid keyboard, according to the adjustment ratio and the current state of the input-method keyboard.

A full keyboard unit 8045 configured to convert the layout of the current input-method keyboard to a full keyboard when the adjustment ratio is larger than 1 and the current input-method keyboard is in the minimum state.

A nine-grid keyboard unit 8046 configured to convert the layout of the current input-method keyboard to a nine-grid keyboard when the adjustment ratio is smaller than 1 and the current input-method keyboard is in the intermediate state.

Specifically, the acquisition module 803 is further configured to determine whether to obtain the state of the current input-method keyboard according to the adjustment ratio; and, if the adjustment ratio does not equal to 1, to obtain the state of the current input-method keyboard.

Further, the adjustment module 804 includes a decision and adjustment unit 8047 configured to determine whether to adjust the size and layout of the current input-method keyboard according to the adjustment ratio and the current state of the input-method keyboard.

Correspondingly, the adjustment module 804 is further configured to adjust the size and layout of the current input-method keyboard, when the current input-method keyboard is in the maximum state and the adjustment ratio is smaller than 1, or when the current input-method keyboard is in the intermediate state, or when the current input-method keyboard is in the minimum state and the adjustment ratio is larger than 1.

Persons of ordinary skill in the art may understand and implement part or all the steps mentioned in above embodiments by hardware, or by programs which may instruct corresponding hardware. Such program can be stored in computer readable memory, such as read only memory (ROM), disk, CD, etc.

Figure 12:
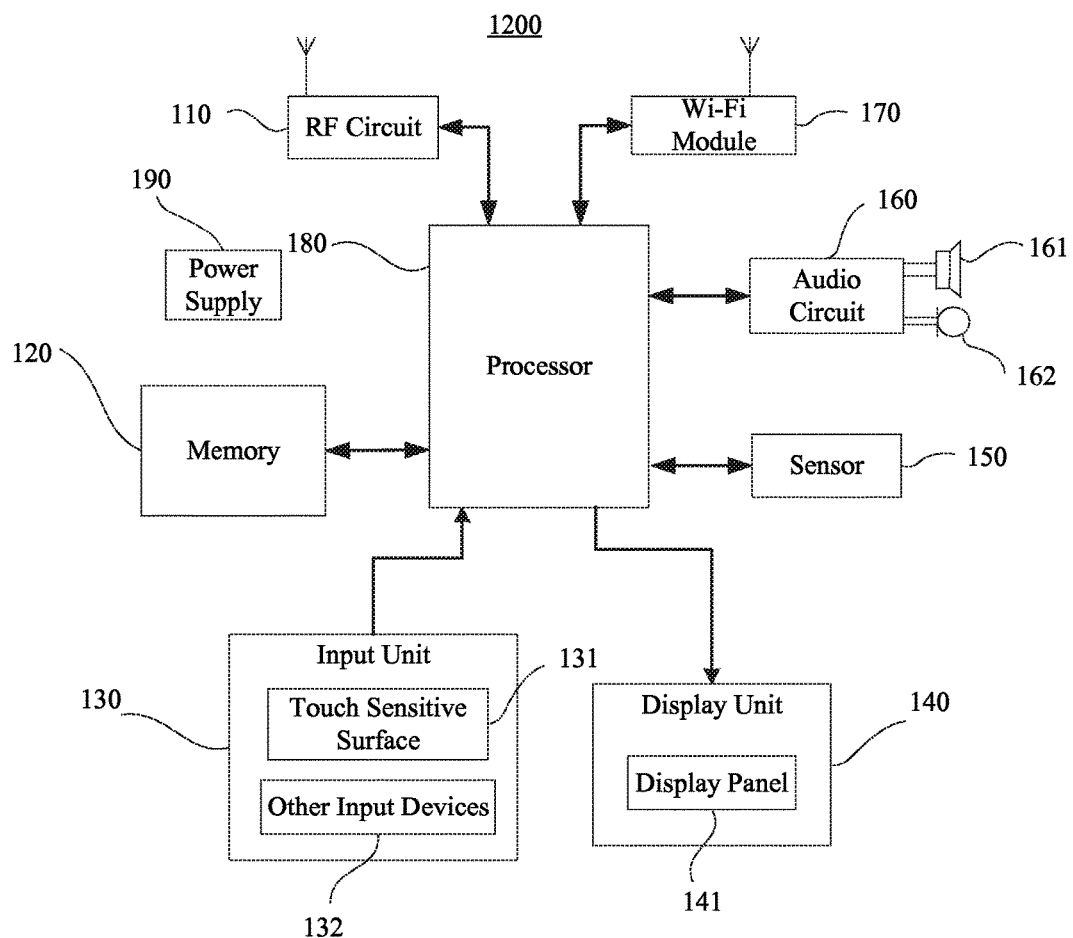
FIG. 12 is a schematic diagram of an exemplary mobile terminal with touch sensitive surface consistent with the disclosed embodiments.

FIG. 12 is a schematic diagram of an exemplary mobile terminal with touch sensitive surface consistent with the disclosed embodiments. Such mobile terminal may be used to implement the method for adjusting an input-method keyboard provided in the embodiments mentioned above.

The mobile terminal 1200 may include an RF (Radio Frequency) circuit 110, one or more computer readable memory 120, an input unit 130, a display unit 140, a sensor 150, an audio circuit 160, a Wi-Fi (wireless fidelity) module 170, one or more core processors 180, a power supply 190, etc. Persons of ordinary skill in the art may understand that the mobile terminal illustrated in FIG. 12 does not limit the mobile terminal structure. Compared to FIG. 12, a mobile terminal may include more or less components, or combine some components, or have different layouts of the components.

Specifically, the RF circuit 110 may be used to send and receive messages, and send and receive signal during a call. Particularly, after receiving downlink information from a base station, the RF circuit 110 sends the information to one or more processors 180 for processing. In addition, the RF circuit 110 sends uplink information to a base station. Generally, the RF circuit 110 includes but not limited to: at least one amplifier, a tuner, one or more oscillators, Subscriber Identity Module (SIM) card, a transceiver, a coupler, a Low Noise Amplifier (LNA), a duplexer, etc. Besides, the RF circuit 110 may communicate with other devices through wire or wireless communication. Such wireless communication may adopt any communication standard or protocol which includes but not limited to: GSM (Global System of Mobile communication), GPRS (General Packet Radio Service), CDMA (Code Division Multiple Access), WCDMA (Wideband Code Division Multiple Access), LTE (Long Term Evolution), email, SMS(Short Messaging Service), etc.

The memory 120 may store software programs and modules. The processor 180 may perform various functions and data processing applications by running the software programs and modules stored in the memory 120. The memory 120 may mainly include program memory section and data memory section; wherein program memory section may store an operating system, at least one function required application (for example, a sound playback function, an image playback function, etc.); data memory section may store the data created by using the mobile terminal 1200 (such as audio data, phonebook, etc.). Further, the memory 120 may include high-speed random access memory, and can also include non-volatile memory, such as at least one disk storage, flash memory, or other non-volatile memory. Correspondingly, the memory 120 may further include memory controller which provides access for the processor 180 and the input unit 130 to the memory 120.

The input unit 130 may send and receive entered numbers or characters information, and provide input signal related to users' settings and functional controls for keyboard, mouse, joystick, optical signal or trackball signal. Specifically, the input unit 130 may include a touch sensitive surface 131 and other input devices 132. The touch sensitive surface 131, known as touch screen or track pad, may collect a user's touch operation on it or near it (for example, a user applies any proper object or accessory such as a finger or a stylus pen on the touch sensitive surface 131 or close to the touch sensitive surface 131), and drive the corresponding connection apparatus according to a preset program. Alternatively, the touch sensitive surface 131 may include two parts: a touch detection device and a touch controller. Specifically, the touch detection device may detect the orientation of a user's touch, detect the signals caused by the touch operation and transmit the signal to the touch controller. The touch controller may receive the touch information from the touch detection device, convert such information into contact point coordinates, and then send to the processor 180. The touch control device may also receive and implement commands from the processor 180. Moreover, the touch sensitive surface 131 may be achieved by various types of technologies such as resistive, capacitive, infrared and surface acoustic wave. In addition to the touch sensitive surface 131, the input unit 130 may also include other input devices 132. Specifically, other input devices 132 may include, but are not limit to one or more types among physical keyboard, function keys (such as volume control buttons, on/off switches, etc.), trackball, mouse, operating lever, etc.

The display unit 140 may be used to display information input by the user or messages provided for the user, and a variety of graphical user interfaces of the mobile terminal 1200. The graphical user interfaces may consist of graphics, text, icons, videos, and any combination thereof. The display unit 140 may include a display panel 141. Optionally, LCD (Liquid Crystal Display), OLED (Organic Light-Emitting Diode) may be used to configure the display panel 141. Further, the touch sensitive surface 131 may cover display panel 141. When detecting touch operation on it or near it, the touch sensitive surface 131 sends signals to the processor 180 to determine the type of touch event. Subsequently, the processor 180 provides corresponding visual output on the display panel 141 according to the touch event type. Although in FIG. 8, the touch sensitive surface 131 and the display panel 141 appear to be two separate components to achieve the input and output functions, some embodiments may integrate the touch sensitive surface 131 and the display panel 141 together to implement input and output functions.

The mobile terminal 1200 may include at least one sensor 150, such as light sensors, motion sensors and other sensors. Specifically, light sensors may include an ambient light sensor and a proximity sensor. The ambient light sensor may adjust the brightness of the display panel 141 according to the brightness of ambient light. The proximity sensor may turn off the display panel 141 and/or backlight when the mobile terminal 1200 moves to an ear. As a motion sensor, the gravity sensor may detect the amplitude of accelerations in various directions (typically in three axes), may detect the amplitude and direction of gravity when motionless, may be used in applications that recognize the cell phone state (such as horizontal and vertical screen rotation, related games, magnetometer calibration), and may provide vibration detection related functions (such as pedometer, percussions). The mobile terminal 1200 may include other sensors such as gyroscope, barometer, hygrometer, thermometer, infrared sensor, etc., details of which are omitted here.

An audio circuit 160, a speaker 161 and a microphone 162 may provide an audio interface between a user and the mobile terminal 1200. The audio circuit 160 may convert received audio data to electric signals, transmit to the speaker 161, and the speaker 161 may convert the signal to audio output. On the other hand, the microphone 162 converts collected audio signals to electric signal, and the audio circuit 160 receives the electric signal and converts to audio data, after being exported to and processed by the processor 180, the audio data may be sent to for example another mobile terminal through the RF circuit 110, or be exported to the memory 120 for further processing. The audio circuit 160 may also include earplug jack to provide communications between peripheral headphones and the mobile terminal 1200.

Wi-Fi is one short-range wireless technology. The mobile terminal 1200, via the Wi-Fi module 170, may help users to send and receive emails, browse web pages, access streaming media, etc., thus providing users with wireless broadband internet access. Although the Wi-Fi module 170 is illustrated in FIG. 12, understandably, it is not a necessity for the mobile terminal 1200 and can be omitted, on the premise of not changing the scope and nature of the present invention, when required.

The processor 180 is the control center of the mobile terminal 1200. It connects various parts of a cell phone by various ports and circuits. By running or executing software programs and/or modules saved in the memory 120, as well as calling data saved in the memory 120, the processor 180 performs a variety of functions and data processing for the mobile terminal 1200, thus performs overall monitoring of the mobile terminal. Optionally, the processor 180 may include one or more processors. Moreover, the processor 180 may integrate an application processor and a modem processor; wherein the application processor mainly handles operating system, user interface, applications and so on; the modem processor is mainly responsible for wireless communication. Understandably, the modem processor may not be integrated in the processor 180.

The mobile terminal 1200 may also include a power supply 190 (for example, battery) which provides power for the various components. Preferably, the power supply 190 may be logically connected to the processor 180 through a power management system, thus implementing functions such as charging, discharging and power management functions via the power management system. The power supply 190 may further include one or more AC or DC power supplies, a recharging system, a power failure detection circuit, a power converter or inverter, a power status indicator and other possible components.

Although not shown, the mobile terminal 1200 may also include a camera, a Bluetooth module and so on, details of which are omitted here. Specifically in the present embodiment, the display unit 140 of the mobile terminal 1200 is touch screen display. The mobile terminal 1200 further comprises a memory 120, one or more programs, wherein the one or more programs are stored in the memory 120. The one or more processors 180 are configured to execute instructions from the one or more programs for performing the following operations:

recording the sliding trajectories of a user's two fingers, and the sliding trajectories include two starting contact points and two ending contact points produced in the two-finger sliding gesture;

calculating an adjustment ratio according to the recorded sliding trajectories;

obtaining the current state of the input-method keyboard, and the state of the input-method keyboard can be one of a maximum state, an intermediate state and a minimum state; and adjusting the size and/or layout of the current input-method keyboard according to the adjustment ratio and the current state of the input-method keyboard.

The implementation described above is assumed to be a first possible embodiment. On the basis of the first possible embodiment, in the second possible embodiment, the memory in the terminal may further include instructions for performing the following operations:

calculating the distance between the two starting contact points and the distance between the two ending contact points; and dividing the distance between the two ending contact points by the distance between the two starting contact points to obtain the adjustment ratio.

In a third embodiment on the basis of the first embodiment, the memory of the terminal may further include instructions for performing the following operations:

determining whether to obtain the current state of the input-method keyboard according to the adjustment ratio; and when the adjustment ratio is not equal to 1, obtaining the current state of the input-method keyboard.

In a fourth possible implementation on the basis of the first implementation, the memory of the terminal may further include instructions for performing the following operations:

determining whether to enlarge or shrink the current input-method keyboard according to the adjustment ratio and the current state of the input-method keyboard;

when the adjustment ratio is larger than 1 and the current input-method keyboard is in the minimum or intermediate state, enlarging the current input-method keyboard from the minimum state to the intermediate state, or from the intermediate state to the maximum state; and when the adjustment ratio is less than 1 and the current input-method keyboard is in the intermediate or maximum state, shrinking the current input-method keyboard from the intermediate state to the minimum state, or from the maximum state to the intermediate state.

In a fifth possible implementation on the basis of the first implementation, the memory of the terminal may further include instructions for performing the following operations:

determining whether to convert the layout of the current input-method keyboard to a full keyboard or a nine-grid keyboard according to the adjustment ratio and the current state of the input-method keyboard;

when the adjustment ratio is larger than 1 and the current input-method keyboard is in the minimum state, converting the layout of the current input-method keyboard to a full keyboard; and when the adjustment ratio is smaller than 1 and the current input-method keyboard is in the intermediate state, converting the layout of the current input-method keyboard to a nine-grid keyboard.

The above-described preferred embodiments of the present invention is not intended to limit the present invention. Any modifications, equivalent replacements, improvements, etc., within the spirit and principles of the present invention should be included within the scope of the present disclosure.

What is claimed is:

1. A method for adjusting an input-method keyboard, comprising:
   recording sliding trajectories of a user's two fingers on a screen of a computing terminal, the sliding trajectories including two starting contact points and two ending contact points produced by contacting, sliding and removal of the user's both two fingers from the screen;
   calculating an adjustment ratio according to the recorded sliding trajectories;
   obtaining a current state of the input-method keyboard, the state of the input-method keyboard being one of a maximum state corresponding to a first full keyboard, an intermediate state corresponding to a second full keyboard, and a minimum state corresponding to a nine-grid keyboard, wherein the second full keyboard occupies less screen space than the first full keyboard; and
   adjusting at least one of a size and a layout of the current input-method keyboard according to the adjustment ratio and the current state of the input-method keyboard, including:
      when the adjustment ratio is larger than 1 and the current input-method keyboard is in the minimum state, converting the layout of the current input-method keyboard to the second full keyboard corresponding to the intermediate state; and
      when the adjustment ratio is larger than 1 and the current input-method keyboard is in the intermediate state, enlarging the current input-method keyboard from the second full keyboard corresponding to the intermediate state to the first full keyboard corresponding the maximum state,
   wherein the method further comprises:
      before obtaining the current state of the input-method keyboard, determining, only when the sliding of the user's both two fingers is completed, whether to obtain the current state of the input-method keyboard according to the adjustment ratio, the adjustment ratio being obtained according to the two starting contact points and the two ending contact points, wherein the sliding of the user's both two fingers is determined as being completed in response to detecting that the user's both two fingers end contact with the screen of the computing terminal to avoid unintentional moving of a selected keyboard on the screen; and
      in response to determining that the adjustment ratio is not equal to 1, obtaining the current state of the input-method keyboard;
   wherein calculating the adjustment ratio according to the recorded sliding trajectories include:
      calculating a distance between the two starting contact points and a distance between the two ending contact points;
      dividing the distance between the two ending contact points by the distance between the two starting contact points to obtain a division result; and
      reducing a precision level of the division result to obtain the adjustment ratio, including: obtaining the adjustment ratio by keeping only one digit after a decimal point of the division result, the reduced precision level resulting in faster processing of size and layout adjustment for a selected keyboard;
   wherein adjusting size and layout of the current input-method keyboard according to the adjustment ratio and the current state of the input-method keyboard further includes:
      determining whether to retain the size and the layout of the current input-method keyboard according to the adjustment ratio and the current state of the input-method keyboard;
      when the adjustment ratio is larger than 1 and the current input-method keyboard is in the maximum state, determining to retain the size and the layout of the current input-method keyboard;
      when the adjustment ratio is less than 1 and the current input-method keyboard is in the minimum state, determining to retain the size and the layout of the current input-method keyboard; and
      adjusting at least one of the size and the layout of the current input-method keyboard when the adjustment ratio is larger than 1 and the current input-method keyboard is not in the maximum state or when the adjustment ratio is less than 1 and the current input-method keyboard is not in the minimum state, including:
         when the adjustment ratio is less than 1 and the current input-method keyboard is in the intermediate state, shrinking the current input-method keyboard from the intermediate state to the minimum state and converting the layout of the current input-method keyboard from the second full keyboard to the nine-grid keyboard; and
         when the adjustment ratio is less than 1 and the current input-method keyboard is in the maximum state, shrinking the current input-method keyboard from the maximum state to the intermediate state and determining not to adjust the layout of the current input-method keyboard.

2. A mobile terminal, comprising: at least one processor configured to:
   record sliding trajectories of a user's two fingers on a screen of a computing terminal, the sliding trajectories including two starting contact points and two ending contact points produced by contacting, sliding and removal of the user's both two fingers from the screen;
   calculate an adjustment ratio according to the recorded sliding trajectories;
   obtain a current state of the input-method keyboard, the state of the input-method keyboard being one of a maximum state corresponding to a first full keyboard, an intermediate state corresponding to a second full keyboard, and a minimum state corresponding to a nine-grid keyboard, wherein the second full keyboard occupies less screen space than the first full keyboard; and adjust at least one of a size and a layout of the current input-method keyboard according to the adjustment ratio and the current state of the input-method keyboard, including:

when the adjustment ratio is larger than 1 and the current input-method keyboard is in the minimum state, converting the layout of the current input-method keyboard to the second full keyboard corresponding to the intermediate state; and when the adjustment ratio is larger than 1 and the current input-method keyboard is in the intermediate state, enlarging the current input-method keyboard from the second full keyboard corresponding to the intermediate state to the first full keyboard corresponding the maximum state, wherein the at least one processor is further configured to:

before obtaining the current state of the input-method keyboard and after the sliding of the user's both two fingers is completed, determine whether to obtain the current state of the input-method keyboard according to the adjustment ratio, the adjustment ratio being obtained according to the two starting contact points and the two ending contact points, wherein the sliding of the user's both two fingers is determined as being completed in response to detecting that the user's both two fingers end contact with the screen of the computing terminal to avoid unintentional moving of a selected keyboard on the screen; and in response to determining that the adjustment ratio is not equal to 1, obtain the current state of the input-method keyboard, wherein the at least one processor is further configured to:

calculate a distance between the two starting contact points and a distance between the two ending contact points;

divide the distance between the two ending contact points by the distance between the two starting contact points to obtain a division result; and reduce a precision level of the division result to obtain the adjustment ratio, including: obtaining the adjustment ratio by keeping only one digit after a decimal point of the division result, the reduced precision level resulting in faster processing of size and layout adjustment for a selected keyboard;

wherein adjusting at least one of a size and a layout of the current input-method keyboard according to the adjustment ratio and the current state of the input-method keyboard further includes:

determining whether to retain the size and the layout of the current input-method keyboard according to the adjustment ratio and the current state of the input-method keyboard;

when the adjustment ratio is larger than 1 and the current input-method keyboard is in the maximum state, determining to retain the size and the layout of the current input-method keyboard;

when the adjustment ratio is less than 1 and the current input-method keyboard is in the minimum state, determining to retain the size and the layout of the current input-method keyboard; and adjusting at least one of the size and the layout of the current input-method keyboard when the adjustment ratio is larger than 1 and the current input-method keyboard is not in the maximum state or when the adjustment ratio is less than 1 and the current input-method keyboard is not in the minimum state, including:

when the adjustment ratio is less than 1 and the current input-method keyboard is in the intermediate state, shrinking the current input-method keyboard from the intermediate state to the minimum state and converting the layout of the current input-method keyboard from the second full keyboard to the nine-grid keyboard; and when the adjustment ratio is less than 1 and the current input-method keyboard is in the maximum state, shrinking the current input-method keyboard from the maximum state to the intermediate state and determining not to adjust the layout of the current input-method keyboard.

3. A non-transitory computer-readable medium having computer program for, when being executed by a processor, performing a method for adjusting an input-method keyboard, comprising:

record sliding trajectories of a user's two fingers on a screen of a computing terminal, the sliding trajectories including two starting contact points and two ending contact points produced by contacting, sliding and removal of the user's both two fingers from the screen;

calculating an adjustment ratio according to the recorded sliding trajectories;

obtaining a current state of the input-method keyboard, the state of the input-method keyboard being one of a maximum state corresponding to a first full keyboard, an intermediate state corresponding to a second full keyboard, and a minimum state corresponding to a nine-grid keyboard, wherein the second full keyboard occupies less screen space than the first full keyboard; and adjusting at least one of a size and a layout of the current input-method keyboard according to the adjustment ratio and the current state of the input-method keyboard, including:

when the adjustment ratio is larger than 1 and the current input-method keyboard is in the minimum state, converting the layout of the current input-method keyboard to the second full keyboard corresponding to the intermediate state; and when the adjustment ratio is larger than 1 and the current input-method keyboard is in the intermediate state, enlarging the current input-method keyboard from the second full keyboard corresponding to the intermediate state to the first full keyboard corresponding the maximum state, wherein the method further comprises:

before obtaining the current state of the input-method keyboard, determining, only when the sliding of the user's both two fingers is completed, whether to obtain the current state of the input-method keyboard according to the adjustment ratio, the adjustment ratio being obtained according to the two starting contact points and the two ending contact points, wherein the sliding of the user's both two fingers is determined as being completed in response to detecting that the user's both two fingers end contact with the screen of the computing terminal to avoid unintentional moving of a selected keyboard on the screen; and in response to determining that the adjustment ratio is not equal to 1, obtaining the current state of the input-method keyboard, wherein calculating the adjustment ratio according to the recorded sliding trajectories include:

calculating a distance between the two starting contact points and a distance between the two ending contact points;

dividing the distance between the two ending contact points by the distance between the two starting contact points to obtain a division result; and reducing a precision level of the division result to obtain the adjustment ratio, including: obtaining the adjustment ratio by keeping only one digit after a decimal point of the division result, the reduced precision level resulting in faster processing of size and layout adjustment for a selected keyboard;

wherein adjusting at least one of a size and a layout of the current input-method keyboard according to the adjustment ratio and the current state of the input-method keyboard further includes:

determining whether to retain the size and the layout of the current input-method keyboard according to the adjustment ratio and the current state of the input-method keyboard;

when the adjustment ratio is larger than 1 and the current input-method keyboard is in the maximum state, determining to retain the size and the layout of the current input-method keyboard;

when the adjustment ratio is less than 1 and the current input-method keyboard is in the minimum state, determining to retain the size and the layout of the current input-method keyboard; and adjusting at least one of the size and the layout of the current input-method keyboard when the adjustment ratio is larger than 1 and the current input-method keyboard is not in the maximum state or when the adjustment ratio is less than 1 and the current input-method keyboard is not in the minimum state, including:

when the adjustment ratio is less than 1 and the current input-method keyboard is in the intermediate state, shrinking the current input-method keyboard from the intermediate state to the minimum state and converting the layout of the current input-method keyboard from the second full keyboard to the nine-grid keyboard; and when the adjustment ratio is less than 1 and the current input-method keyboard is in the maximum state, shrinking the current input-method keyboard from the maximum state to the intermediate state and determining not to adjust the layout of the current input-method keyboard.

4. The method according to claim 1, wherein:

the second full keyboard and the nine-grid keyboard are configured to move to a location on a display screen based on a user input.

5. The method according to claim 1, wherein:

the first full keyboard and the second full keyboard have a same layout.

\* \* \* \* \*